United States Patent [19]
Yang

[11] Patent Number: 5,418,891
[45] Date of Patent: May 23, 1995

[54] PRINTER SHARING DEVICE

[76] Inventor: Jeng R. Yang, 10F-1, No. 291, Sec. 2, Fu-Hsings. Rd., Taipei, Taiwan, Prov. of China

[21] Appl. No.: 845,025

[22] Filed: Mar. 3, 1992

[51] Int. Cl.⁶ ............................................ G06F 15/00
[52] U.S. Cl. .................................................... 395/114
[58] Field of Search ............... 395/114, 101, 112, 325; 307/43, 64, 18, 23, 29; 358/402, 405, 407; 400/63, 76, 70, 77

[56] References Cited

U.S. PATENT DOCUMENTS 4,754,428  6/1988  Schultz et al. ..................... 395/114
5,090,830  2/1992  Kroeger et al. .................... 395/114

Primary Examiner—Arthur G. Evans
Attorney, Agent, or Firm—Bacon & Thomas

[57] ABSTRACT

The invention herein relates to a kind of computer printer sharing device that enables the simultaneous operation of up to four printers and which utilizes an ordinary six-conductor telephone cable to transfer printer signals and, furthermore, the main components of the aforesaid printer sharing device consists of a transmitting adapter, receiving adapter and the aforementioned telephone cable; the aforesaid transmitting adapter and receiving adapter are designed around a single microprocessor integrated-circuit (IC) chip, of which only one input/output (I/O) pin per printer is used for signal communications between the invention herein and the printers.

9 Claims, 4 Drawing Sheets

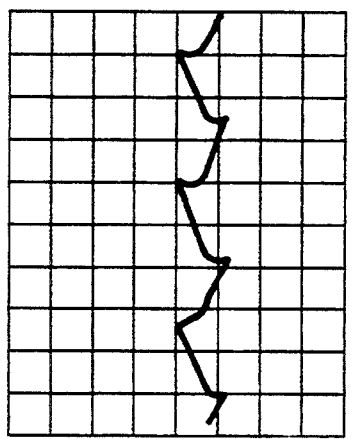
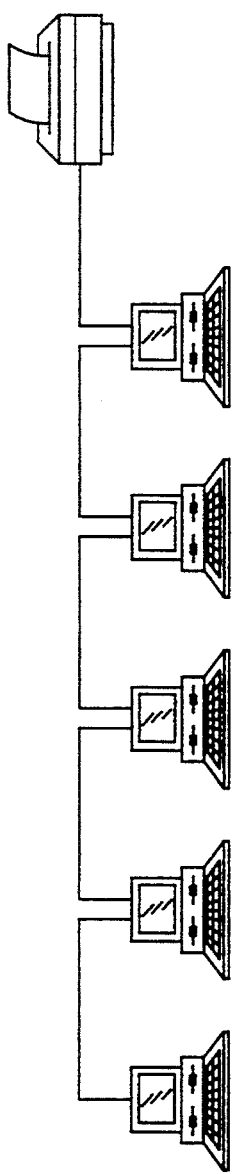
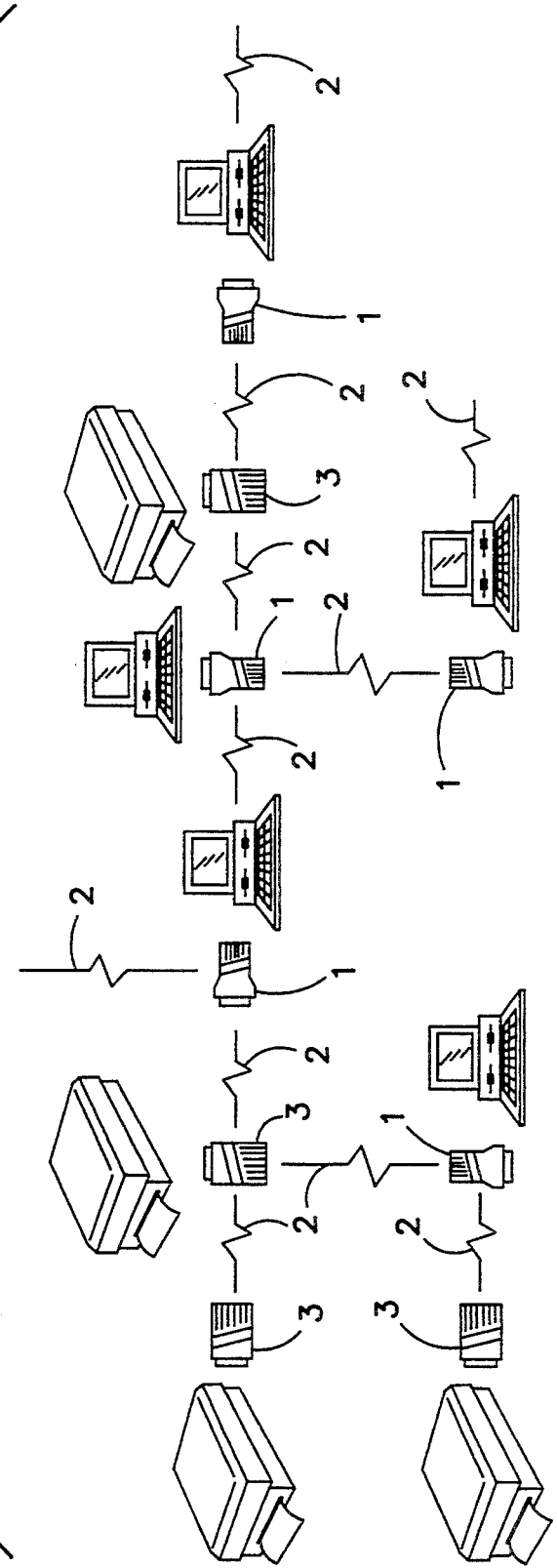
FIG. 1
FIG. 2
FIG. 5

PRINTER SHARING DEVICE

BACKGROUND OF THE INVENTION

1. Field of the Invention

The invention herein relates to a kind of printer sharing device for computers which requires no external power supply and which is connected between computers and the printers via telephone cables the aforesaid printer sharing device can enable and disable itself automatically or be controlled by the software of the computer to switch between different printers: a single-chip microprocessor operates in series between the controller section of the computer and the controller section of the printers to handle data transfer and control code signal communications, and only one input/output (I/O) pin of the aforementioned microprocessor is required to enable the aforesaid communications; the controller section of the computer and the controller section of the printers are connected to the I/O pin of the microprocessor integrated circuit (IC) via wire conductor; when a printer is not in active use the conductance path office I/O pin is automatically transformed into a high resistance input state, wherein electrical conductivity is minimized; as a result, more than 25 computers can be connected to the invention herein and moreover, since the wire conductor in non-directional the printer sharing device can be connected to virtually any number of distribution points up to a distance of 1,200 feet to support a data flow rate of up to 80K bit per second.

2. Description of Related Art

With regard to conventional printer sharing devices for computers currently available one type is the switch box which has a mechanical switch; the switch box is connected to the 25-pin printer output port of a computer and the mechanical switch is operated manually to select a printer; another type of conventional printer sharing device has an electronic circuit that allows automatic switching and software can be used to select a printer. These two types of conventional printer sharing devices are basically centrally configured in that the printer sharing device is connected via the printer cable between the computer and the printer, so the length of the printer cable is limited, frequently to a maximum length of 25 meters and, furthermore, if there is an excessive number of computers and printers, then the installation of the required printer cables is inconvenient; therefore, the aforemention two types of printer sharers are frequently limited to manufacture in a four-to-two, two-to-one and other printer-to-computer distribution ratios to enable practical usage.

At present, there is a relatively improved method of printer sharing that is indicated in FIG. 1, wherein an automatically switching printer sharing device supports linked distribution; the aforesaid type of automatic printer sharing device utilizes a hardware-based circuit to output printer control code and data signals which are transferred in series through a four-conductor telephone cable to a receiver adapter at the printer, the aforesaid receiver adapter then transfers the inputted control code and data signals into the printer; when the aforementioned cable is already in the process of transferring signals, then the aforementioned circuit automatically disables computer output to the printer. The advantage of this type of printer sharing device is that a relatively high number of computers can be connected and that the installing of the requisite connector cables is convenient.

However, the capability of the conventional linked-distribution automatically switching printer sharing device is still subject to certain limitations because the printer relies on handshaking to coordinate data transfers flowing between the computer and the printer; as a result, a minimum of three conductors must be present in the interfacing cable (transmit line, receive line and ground line), and only one printer can be connected with four-conductor cable; some types of linked-distribution automatically switching printer sharing devices now available on the market can be connected to many printers and with regard to the printer settings, the software of the computer selects the printer; however, only one printer can be utilized at a time because when the connecting cable is conducting communications signals, the other printers are disabled. In addition, when the high-speed data transmission distance is long, if the impedance is not matched and there is no sheilding against spurious electromagnetic emissions interference (EMI), it is extremely easy for data transmission errors to occur; ordinary telephone cable has no effective shielding against spurious EMI and, furthermore, since the number of computers connected may vary, it is difficult to determine the proper matching impedance; therefore, the transmission distance of the conventional printer sharers of this type now in current use is very short and if the transmission is lengthened, it is necessary to add a repeater circuit, which has a low transistor-to-transistor logic (TTL) signal transmission rate of 50K bit per second; the aforesaid transmission rate is too slow for high-speed printers or buffer-equipped printers.

In addition, all of the aforementioned conventional printer sharing devices accomplish automatic functions through the utilization of a high number of digital ICs, IC chip sets and other electronic components to increase capability; some printer sharers, especially units with long-distance transmission capability or that can be connected to a relatively large number of computers, even require an external power supply. Moreover, since the cable from the printer sharer has a fixed transmission direction the printer must be connected at the opposite terminal point, making it impossible to connect according to preference and also limiting the connection capacity to only 20 computers.

BRIEF DESCRIPTION OF THE DRAWINGS

FIG. 1 is a diagram of a conventional automatically switching printer sharing device in a linked-distribution configuration.

FIG. 2 is a diagram of the invention herein shown in a branched distribution configuration in which many printers are automatically switched into service.

FIG. 5 shows the waveform patterns produced after data was transmitted for a distance of 1,200 feet.

DETAILED DESCRIPTION OF THE PREFERRED EMBODIMENTS

Figure 3:
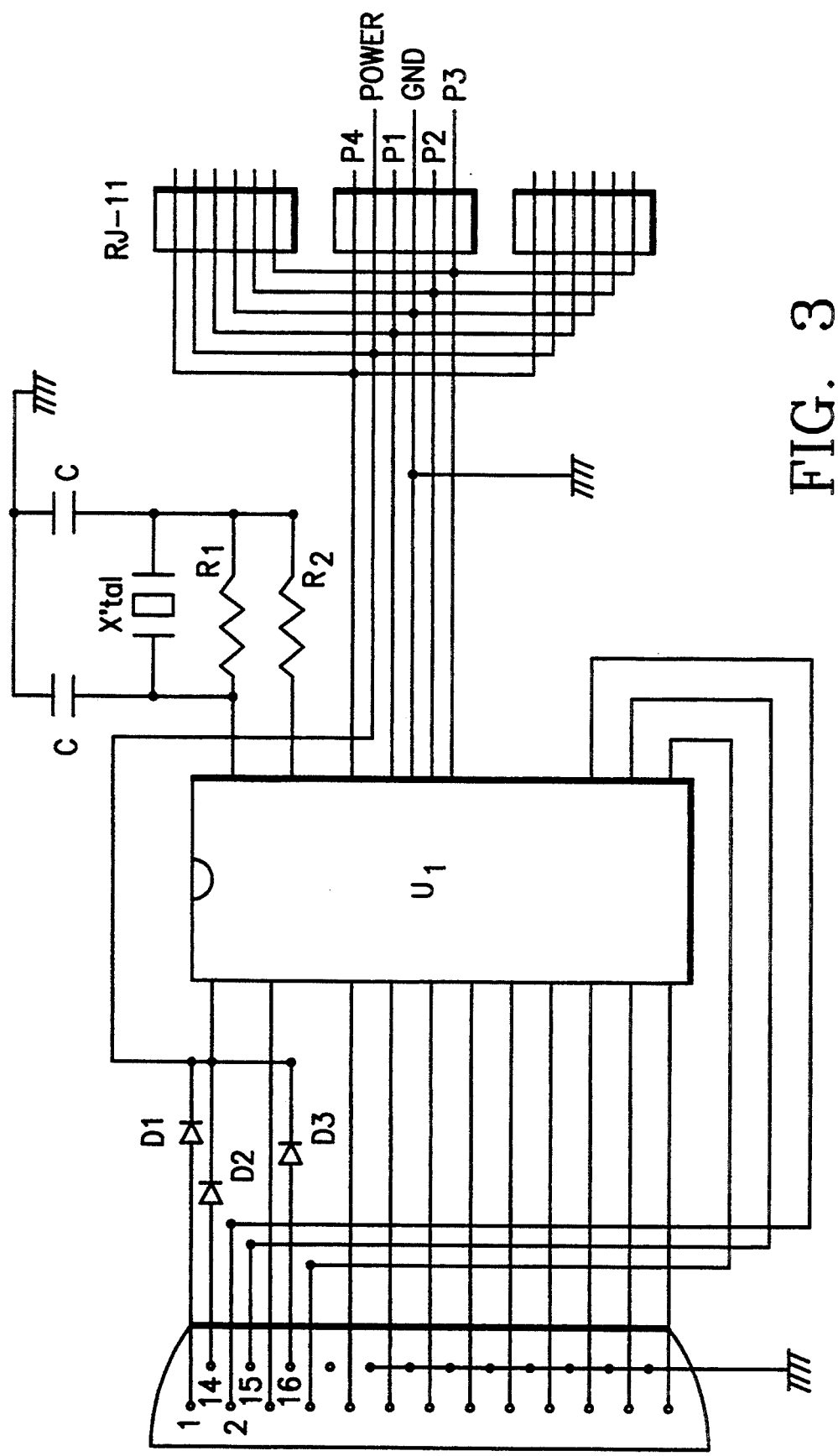
FIG. 3 is a digital schematic diagram of the computer controller unit of the invention herein.
Figure 4:
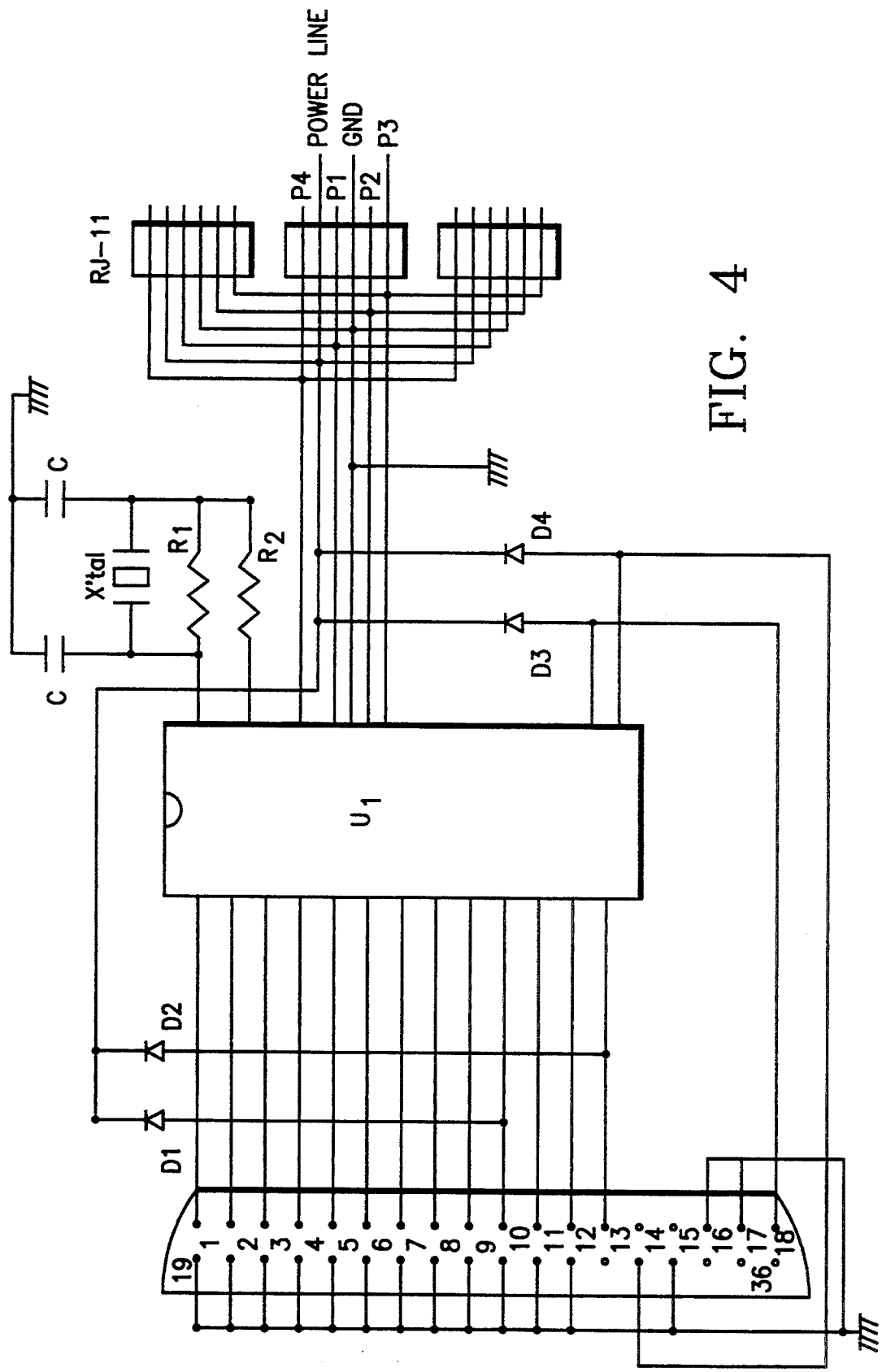
FIG. 4 is the digital schematic diagram of the printer controller unit of the invention herein.
Figure 6:
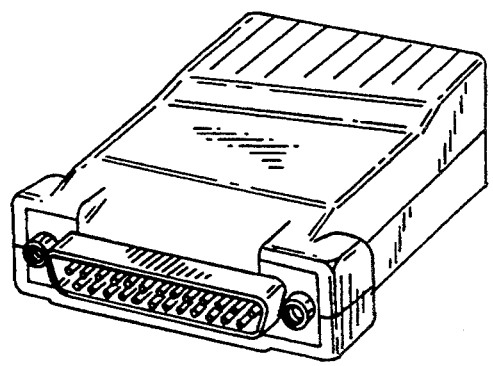
FIG. 6 is a diagram of the computer controller unit of the invention herein.
Figure 7:
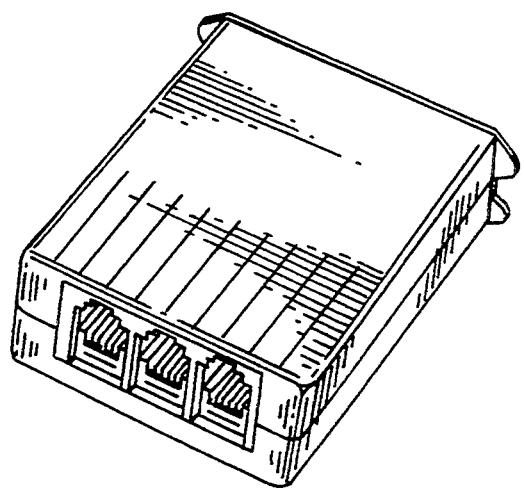
FIG. 7 is a diagram of the printer controller unit of the invention herein.

As indicated in FIG. 2, the invention herein consists of a computer controller unit (PCC) (1), a telephone cable (2) and a printer controller unit (PNC) (3); as shown by the digital schematic diagram in FIG. 3, the computer controller unit(I) is comprised of a 25-pin male connector which is connected to a 25-pin female parallel output port (LPT1, LPT2) on the computer, controller IC U1 and three identical female RJ-11 connectors. As illustrated by the digital schematic diagram in FIG. 4, the printer controller unit (3) is comprised of a 36-pin male Centronics connector which is connected to the 36-pin female Centronics input port on the printer controller IC U2 and three identical female RJ-11 connectors; all signal communications flowing between the computer controller unit (1) and the printer controller unit (3) are transferred via the telephone cable (2) which is connected in series between the computer controller unit (1) and the printer controller unit (3) and, furthermore, the aforesaid telephone cable (2) may be utilized to establish an in-series connection between the computer controller unit (1) and the printer controller unit (3) through any respective pair of the aforementioned female RJ-11 connectors on the computer controller unit (1) and the printer controller unit (3); therefore, the line distribution method is extremely flexible since the connection can be linked or branched. Conventional linked-distribution automatically switching printer sharing devices frequently have two RJ-11 connectors; one for input and one for output, and cannot be connected in any other way. The respective ICs of the computer controller unit. (I) and the printer controller unit (3) are of software-hardware integrated ASIC manufactured design, with the main capabilities being high-speed connectivity, port switching and data transmission signal control. Most conventional counterpart ICs achieve high-speed connectivity and port switching by relying on a hardware-based circuitry consisting of an IC chip set and digital ICs combination; therefore, the controller circuit can become very complex if the aforesaid IC chip and digital ICs structure is adapted to yield the capability of interfacing many computers and printers together. The invention herein overcomes this major shortcoming by utilizing a software approach to attain the objective of high-speed processing and also by specially designing a single-chip microprocessor with a number of set instructions to serve as the controller ICs of the invention herein and, furthermore, in order to realize the objective of low electrical power consumption, the aforesaid controller ICs are complementary metal-oxide semiconductor (CMOS) components that require only 3.5 volts at 2 milliamps (mA) of power for operation.

In addition, the aforementioned IC has trinary state I/O pins that can be programmed to reach a high resistance state, or a high or low output state; when the respective I/O pins of the computer controller unit (1) and printer controller unit (3) are connected in series via the telephone cable (2), one I/O pin of the computer controller unit (1) is connected to one conductor of the telephone cable (2), and to each conductor of the telephone cable (2) routed to a group of printers, only one of the aforesaid conductors is connected to one I/O pin office printer controller unit (3); with regard to which printer is to be connected, the selective switching is handled by the printer controller unit (3); the aforesaid selective switching can be effected by the operator as in the case of a conventional mechanically switched printer sharer device, but since the printer data is transmitted via handshaking, the aforementioned convention printer sharer device requires a receive line and, a transmit line for printing operation to occur; however, since the I/O pins of the invention herein are programmable, when the operating software precisely controls how the computer controller unit (I) will transmit data, then the IC U1 is assigned the function of selecting the printer I/O pin that is to be set in output mode; meanwhile, the I/O pin of IC U2 in the printer controller (3) connected to the selected printer is set to input mode; in other words, when the printer controller unit (3) is ready to transmit data to the computer controller unit (1), the output state is reversed, thereby completing the handshaking operation via a single conductor; as a result, if a four-conductor telephone cable is utilized, then each computer controller unit (1) can selectively switch between two printers and if a six-conductor telephone cable is utilized, then each computer controller unit (1) can selectively switch among four printers; when the printer controller unit (3) and the computer controller unit (1) are both not in active connection to a printer, then the respective I/O pins are automatically set to a high resistance input state, with the low input current level measuring approximately 1 $\mu$A and the high input current level measuring approximately 5 $\mu$A; although the aforesaid I/O pins are not in continuity with any tranmitted data signals, the nominal electrical current in the I/O pins is at an extremely low value and therefore unable to interfere with ongoing communications between a printer controller (3) and a computer controller unit (1); due to the aforesaid high resistance I/O-pin characteristics, the invention herein can be interfaced with more than 25 computers without the occurrence of operational errors, but in a typical installation, only about 15 computers are interfaced.

In addition, the invention herein can executed by computer software and the aforesaid software is resident and capable of being initiated whenever any other software whatsoever is operating on the computer; when the aforementioned resident software is initiated, a small window listing the printer selection is displayed and the operator can select the number of the printer connected to port LPT1 and LPT2 at address 378H, 278H or 3BCH, then input the data representing the choice to the controller IC of the computer controller unit and the controller IC of file printer controller unit, the process of which occurs according to the following sequence of events: When no printer is connected to the controller IC of the computer controller unit, then the aforesaid controller IC scans the data output to determine whether or not a printer request is set; if a printer request has been set, then the controller IC of the computer controller unit will access the data output I/O pin set for the selected, printer and activate the aforesaid printer into the on-line printing mode. When the computer controller unit receives a print request, the computer controller IC first performs a check on the transmission line to determine whether another computer has already accessed the aforesaid transmission line and if the aforesaid transmission is occupied, then the computer controller IC sends a printer error status message to port LPT1 or port LPT2 of the computer; if the aforementioned transmission line is occupied, then the computer controller IC sends serial data signals, one byte at a time, to the printer controller unit and the printer controller unit automatically performs a parity error check upon reception of the aforesaid serial data; if data errors are received by the printer controller unit, the printer controller unit sends a re-transmit instruction to the computer controller unit and if the data is received without errors, then the printer controller unit sends an acknowledge instruction to the computer controller unit, while simultaneously sending the error-free serial data to the target printer to be printed and notifying the computer to continue sending down single-byte data. The invention herein does not rely on a program in the host computer itself to select a printer, but automatically searches for, selects and sends printer data to an available printer.

When transmitting data over a long distance, due to the continuous influence of standing waves and electromagnetic interference, a digital signal square waveform can be deflected into an analog signal sine waveform, as depicted in FIG. 5; consequently, whenever there is a change in logic, bit errors readily occur and with specific reference to the sine wave in FIG. 5, the appearance of a sine wave indicates that a change in the prevailing logic state has transpired over a certain period of time and that digital communications cannot resume until the digital integrity of the aforesaid logic state is restored; therefore, in addition to performing a software-based error check, the controller IC of the invention herein also carries out a hardware-based operation in which the reading of data bits by the aforesaid controller IC is terminated whenever a change in logic state is detected and then resumed only when the logic state is stabilized; as a result, the invention herein eliminates the incidence of data read errors that lead to erroneous operation whenever processing high-speed data transmission sent over long distances. By utilizing this type of method, it is possible to ensure a data transmission rate of 80K bit per second which is effective over a distance of up to 1,200 feet.

Since the controller ICs of the computer controller unit and the printer controller unit are CMOS components that require 3.5 volts at 2 mA for operation, therefore the operating power for the computer controller unit is drawn from the computer through three diodes (D1, D2, D3) and electrical current is outputted from pin 1, pin 14 and pin 16; meanwhile, operating power for the printer controller unit is derived from the printer through four diodes (D1, D2, D3, D4) and electrical power is outputted through pin 10, pin 13, pin 18 and pin 32 and when the printer is not being utilized, then the last mentioned I/O pins are automatically set in a state of high resistance to decrease any input of electrical current to a minimum; therefore, no external power supply is required for the operation of invention herein.

The invention as described above has, in summary, the following capabilities:

(1) With regard to the installation of the invention herein, the transmission cable is not polarized and may be set up in an automatically switching branched configuration; therefore the cable distribution method of the invention herein is more convenient and flexible than conventional linked distribution printer sharing devices.

(2) The invention herein utilizes a telephone cable for the transmission of data and, furthermore, the connection of only one conductor of the aforementioned telephone cable is required to a printer to control printing operation. Therefore, a six-conductor telephone cable can be utilized to control four printers simultaneously.

(3) The invention herein can be utilized to interface more than 25 computers with at least one printer; meanwhile, each printer interfaced can be used by a different computer for printing and the printers can be connected to computers in any way since the printer connection location is not limited to the terminal point.

(4) When the data transmission distance is 1,200 feet, the data transmission rate of the invention herein is 80K bit per second, without the occurrence of errors in transmission.

(5) No external power supply is required fort he operation of the invention herein.

(6) The invention herein remains transparent to the software operating system on the host computer and the operator can switch printers while the aforesaid software is in active execution. When the aforementioned software is not being actively executed, the computer controller unit automatically searches for an unoccupied printer to perform a printing operation.

What is claimed is:

1. A printer sharing device that is connected between computers and printers, and which comprises a computer controller unit, a telephone cable and a printer controller unit; the printer sharing device including means for automatically switching among connected printers while a software application is operating on the computers; the computer controller unit of the aforementioned printer sharing device including a 25-pin male connector that is utilized for connection to the output port (LPT1 or LPT2) on the computer, an IC controller U2 which handles the transmission of data signals and printer control codes, and three identical RJ-11 female connectors through which the data signals and control codes from the I/O pins of the IC controller U2 are inputted and outputted, and the printer controller unit including a 36-pin connector, which is utilized to connect the printer sharing device to the input ports of targetted printers, an IC controller U2, which handles the transmission of data signals and printer control codes, and three identical RJ-11 female connectors, through which the data signals and printer codes from the I/O pins of the IC controller U2 are inputted and outputted, said telephone cable connecting one of said RJ-11 female connectors of the computer controller unit with one of said RJ-11 female connectors of the printer controller unit.

2. A printer sharing device as claimed in claim 1, wherein when the printer controller unit is selectively switched to a printer, the selected printer is set to receive data signals from the I/O pins of the controller IC in the printer controller unit, with the conductor of the aforementioned telephone cable (four-conductor or six-conductor type) being selected for connection to one of the aforesaid I/O pins.

3. A printer sharing device as claimed in claim 1, wherein the controller IC U1 and the controller IC U2 are both single microprocessor IC chips, each having trinary state I/O pins, and each pin can be programmed to a high resistance input state and high or low output state.

4. A printer sharing device as claimed in claim 1, wherein the computer controller unit and the printer controller unit both include means for sending data signals through the I/O pins of the respective ICs connected to the transmission cable and, furthermore, for controlling the I/O-pin state set by the controlling software can be to communicate data signals to the selected receiving printers via only one conductor of the aforementioned telephone side.

5. A printer sharing device as claimed in claim 1, further comprising means including an operator interface which can be called to a computer display in the form of a small windowed control panel for enabling the operator to selectively switch to a desired printer to initiate printing while another software application is operating.

6. A printer sharing device claimed in claim 5, is wherein the printers are selected by inputting the data to be printed from addresses 378H, 3BCH or 278H into the IC controller U1, which then outputs the aforesaid data through the printer port LPT1 or the printer port LPT2 on the computers.

7. A printer sharing device as claimed in claim 1, wherein in the absence of printer request instructions, the I/O pins of said controller ICs U1 and U2 are set to a state of high resistance; meanwhile, the controller IC U1 searches the output of the computer to determine whether or not a print request instruction is present and if the aforesaid U1 detects a print instruction, then the controller IC U1 connects its data output I/O pin to the transmission line leading to the desired printer selected for printing; furthermore, whenever the controller IC U1 receives a print request instruction from a host computer, then the controller IC performs a check on the transmission line connect to the printer to determine whether the aforesaid transmission line is occupied; if the aforementioned transmission line is occupied, then controller IC U1 sends an error message to controller IC U2, but if the aforementioned transmission line is unoccupied, then controller IC U1 sends single-byte data and printer code signals to controller IC U2; when controller IC U2 receives the aforesaid data and printer code signals, then controller IC U2 performs a software-based parity and error check, and if errors are detected then controller IC U2 issues a re-send instruction to controller IC U1, but if no errors are detected, then controller IC U2 issues an acknowledge instruction to controller IC U1, while transferring the intact data and printer code signals to the input port of the targetted printer. Controller IC U1 then notifies the host computer to send the next byte of data.

8. A printer sharer as claimed in claim 1, wherein pin 1, pin 14 and pin 16 of the 25-pin connector are connected in series with one lead of diode D1, diode D2 and Diode D3, respectively; the remaining respective leads of the aforesaid diodes are connected to voltage supply circuit of controller IC U1 to provide the electrical power required for the operation of the computer controller.

9. A printer sharer as claimed in claim 1, wherein pin 10, pin 13, pin 18 and pin 32 of the 36-pin connector are connected in series with diode D1, diode D2, diode D3 and diode D4, respectively; the remaining respective leads of the aforesaid diodes are connected to the voltage supply circuit of controller IC U2 to provide the electrical power required for the operation of the printer controller unit.

* * * * *